(12) United States Patent
Desens et al.

(10) Patent No.: US 7,617,037 B2
(45) Date of Patent: Nov. 10, 2009

(54) SYSTEM FOR AUTOMATICALLY MONITORING A MOTOR VEHICLE

(75) Inventors: Jens Desens, Korb (DE); Stefan Hahn, Ulm (DE); Fridtjof Stein, Ostfildern (DE)

(73) Assignee: Daimler AG, Stuttgart (DE)

( * ) Notice: Subject to any disclaimer, the term of this patent is extended or adjusted under 35 U.S.C. 154(b) by 759 days.

(21) Appl. No.: 10/497,770

(22) PCT Filed: Nov. 30, 2002

(86) PCT No.: PCT/EP02/13546

§ 371 (c)(1),
(2), (4) Date: Jun. 4, 2004

(87) PCT Pub. No.: WO03/047900

PCT Pub. Date: Jun. 12, 2003

(65) Prior Publication Data

US 2005/0043879 A1    Feb. 24, 2005

(30) Foreign Application Priority Data

Dec. 5, 2001    (DE) ............................ 101 59 658

(51) Int. Cl.
  *G06F 17/00* (2006.01)
(52) U.S. Cl. .................... 701/96; 340/435; 340/438; 701/300; 701/41
(58) Field of Classification Search .......... 701/301, 701/96, 1, 300, 41; 342/29, 104, 109; 340/902, 340/903, 435, 436, 444, 465, 438, 426.31, 340/426.32; 180/170, 282

See application file for complete search history.

(56) References Cited

U.S. PATENT DOCUMENTS

| 4,349,823 A | | 9/1982 | Tagami et al. |
| 5,521,579 A | * | 5/1996 | Bernhard ................ 340/438 |
| 5,684,474 A | * | 11/1997 | Gilon et al. ............ 340/903 |

(Continued)

FOREIGN PATENT DOCUMENTS

| DE | 43 13 568 C | 6/1994 |
| DE | 198 21 163 A | 11/1999 |
| DE | 100 12 737 A | 9/2001 |

OTHER PUBLICATIONS

Tsao H-S J et al.: "Design options for operating automated highway systems" Vehicle Navigation and Information System Conference, 1993, Proceedings of the IEEE-IEE Ottawa, Ont., Canada Oct. 12-15, 1993, New York, NY, USA, IEEE, Oct. 12, 1993, Seiten 494-500, XP010219772 ISBN: 0-7803-1235-X.

*Primary Examiner*—Tuan C To
(74) *Attorney, Agent, or Firm*—Patent Central LLC; Stephan A. Pendorf

(57) ABSTRACT

The invention relates to a system for automatically monitoring a motor vehicle, especially for automatically monitoring a vehicle (E) in a traffic jam. Said system comprises at least one sensor (2) for monitoring the space in front of the vehicle (E), and an electronic regulating device for regulating travel, braking and steering. According to the invention, said sensor is designed in such a way that it detects the movement of a vehicle (A) changing lanes in front of vehicle (E). The control of the vehicle is returned to the driver, or the driver is requested to regain control of the vehicle, when motor vehicle (E) shows a desire to follow the lane change of vehicle (A), and when it is determined, by means of the signals of the lateral sensor (8, 10), that during the monitoring, vehicle (E) is not at a sufficiently safe distance from a vehicle (B) detected by the lateral sensor. One such system for automatically monitoring a motor vehicle thus increases road safety in a simple manner.

7 Claims, 3 Drawing Sheets

U.S. PATENT DOCUMENTS

| | | | |
|---|---|---|---|
| 5,874,904 A * | 2/1999 | Hirabayashi et al. | 340/903 |
| 5,923,243 A * | 7/1999 | Bleiner | 340/435 |
| 6,038,496 A * | 3/2000 | Dobler et al. | 701/3 |
| 6,222,447 B1 * | 4/2001 | Schofield et al. | 340/461 |
| 6,226,570 B1 | 5/2001 | Hahn | |
| 6,282,483 B1 * | 8/2001 | Yano et al. | 701/96 |
| 6,298,298 B1 * | 10/2001 | Tange et al. | 701/96 |
| 6,311,123 B1 * | 10/2001 | Nakamura et al. | 701/96 |
| 6,338,022 B1 * | 1/2002 | Shinmura et al. | 701/301 |
| 6,370,471 B1 | 4/2002 | Lohner et al. | |
| 2001/0003810 A1 * | 6/2001 | Shinmura et al. | 701/301 |
| 2001/0014846 A1 * | 8/2001 | Sawamoto et al. | 701/96 |
| 2001/0016797 A1 * | 8/2001 | Ogura et al. | 701/301 |
| 2001/0020217 A1 * | 9/2001 | Matsuno | 701/301 |
| 2002/0041229 A1 * | 4/2002 | Satoh et al. | 340/438 |
| 2004/0085197 A1 * | 5/2004 | Watanabe et al. | 340/435 |

* cited by examiner ated controller for

SYSTEM FOR AUTOMATICALLY MONITORING A MOTOR VEHICLE

Cross Reference To Related Application

This application is a national stage of PCT/EP02/13546 filed Nov. 30, 2002 and based upon DE 101 59 658.8 filed Dec. 5, 2001 under the International Convention.

BACKGROUND OF THE INVENTION

1. Field of Invention

The invention relates to a system for automatic following-distance control of a motor vehicle, in particular for automatic following-distance control of a motor vehicle in a traffic jam, having at least one sensor for monitoring the space in front of the vehicle, and an electronic device for regulating the travel, braking and steering.

2. Related Art of the Invention

Automatic following-distance control is made possible by ACC (Autonomous Cruise Control, sometimes also Adaptive Cruise Control) systems. An ACC system regulates the speed of a vehicle taking into account a vehicle traveling in front, and can under certain circumstances also automatically follow its lane, i.e. change lane automatically.

DE 4313568 C discloses a method for providing assistance for a lane change by a motor vehicle, a so-called lane change aid in which not only the space in front and behind are monitored but also the dead angle is monitored by means of a radar system in the rear view mirror, and the driver is provided, if appropriate, with warnings or instructions if he intends to change lane. In one development, the information from the lane change aid is used for a completely autonomous vehicle guiding system. A similar assistance-providing method which is improved by means of satellite navigation and lane detection means is described in EP 1052143 A.

ACC systems are described, for example, in the documents DE 19637245 A, WO 99/30920, WO 99/32318 and WO 00/62139. The three latter documents also relate to the problems with lane changing and overtaking operations which are made possible by suitable sensor and control systems. A disadvantage is their complexity, not only owing to the expenditure on control technology but also because the driver can only follow a complicated control process with difficulty and therefore has to have "blind" faith in it.

SUMMARY OF THE INVENTION

The object of the invention is to provide a system for automatic following-distance control, including automatic lane changes, which operates simply and reliably.

The object is achieved by means of a system having the features of patent claim 1.

The invention uses not only the known sensor system and signal processing means for following a vehicle but also one or two lateral sensors for monitoring the lateral space(s) behind the motor vehicle. If the vehicle then follows a lane change of a vehicle traveling ahead, it is possible to use the signals of at least one of the lateral sensors to determine whether the vehicle travels along a trajectory which describes the lane change planned within the scope of the process of following the vehicle, without colliding with another vehicle which is located next to the vehicle. In particular, by continuously determining the signals of at least one of the lateral sensors, it is possible to detect if the relative position of a vehicle which is located adjacent to the driver's own vehicle changes significantly; for example due to strong acceleration of the overtaken vehicle. It is therefore determined, through continuous measurement and calculation, whether the motor vehicle maintains, during the following-distance control, a reliable distance from an adjacent vehicle sensed by at least one of the lateral sensors.

If a lateral sensor therefore signals that the motor vehicle undershoots a safe distance from an adjacent vehicle, the driver is preferably requested to assume control of the vehicle, or control of the vehicle is automatically returned to the driver. This is also preferably accompanied by a warning signal. In addition, by means of the signals of the lateral sensor and data from automatic following-distance control relating to the traveling speed and route, it is already possible to calculate in advance, before a safety distance is undershot, whether the vehicle will also maintain a safe distance from an adjacent vehicle in the further course of the journey so that the transfer or handing over of control of the vehicle takes place as early as possible.

In the most favorable case, the invention restricts the manual control of the vehicle to situations which can be reliably mastered only with a very high degree of complexity using a fully automatic system. In contrast, the advantage that the driver can be certain of being able to immediately receive or assume control of the vehicle in critical lane-changing situations is the predominant factor so that the driver does not experience a sense of helplessness with respect to the automatic following-distance control.

Fully automatic following-distance control is relatively complicated and not yet approved for road traffic. The invention permits a type of semiautomatic following-distance control in which the driver is involved in lane changing situations which one would not wish to entrust to the automatic system for safety reasons.

The invention is suitable for any type of automatic following-distance control, and in particular as a system for following-distance control in a traffic jam.

BRIEF DESCRIPTION OF THE DRAWING

Further features and advantages of the invention emerge from the following description of an exemplary embodiment with reference to the drawing, in which, in plan views.

DETAILED DESCRIPTION OF THE INVENTION

Figure 1:
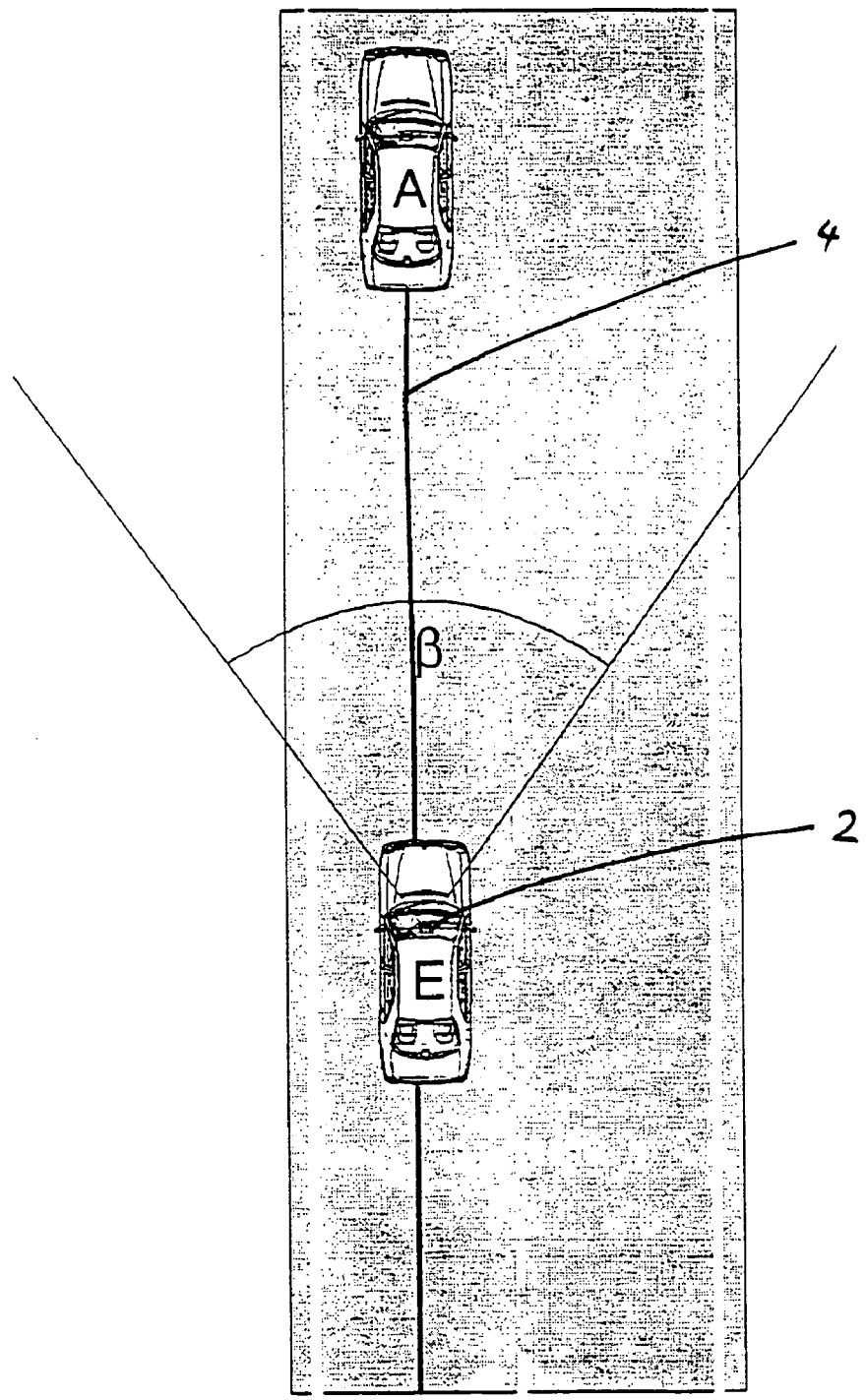
FIG. 1 shows a typical traffic situation with a switched-on automatic control system for a vehicle in a traffic jam.

FIG. 1 shows a vehicle E with a system for automatic following-distance control for a vehicle in a traffic jam, an automatic control system for a vehicle in a traffic jam, which relieves the driver in a traffic jam. For example, a system is known from the prior art and contains a sensor 2 for monitoring the space in front of the vehicle, and an electronic device for regulating the travel, braking and steering, which is not shown. The sensor system for monitoring the space in front of the vehicle (sensor 2 and associated electronic system) is composed, for example, of an image processing system, laser system or radar system with a monitoring angle β for the space in front of the vehicle.

The vehicle E, with a switched-on automatic system for controlling a vehicle in a traffic jam, follows in a completely automatic fashion a vehicle A which is traveling ahead, said vehicle E following along the trajectory 4 on the left-hand lane of a two-lane road.

Figure 2:
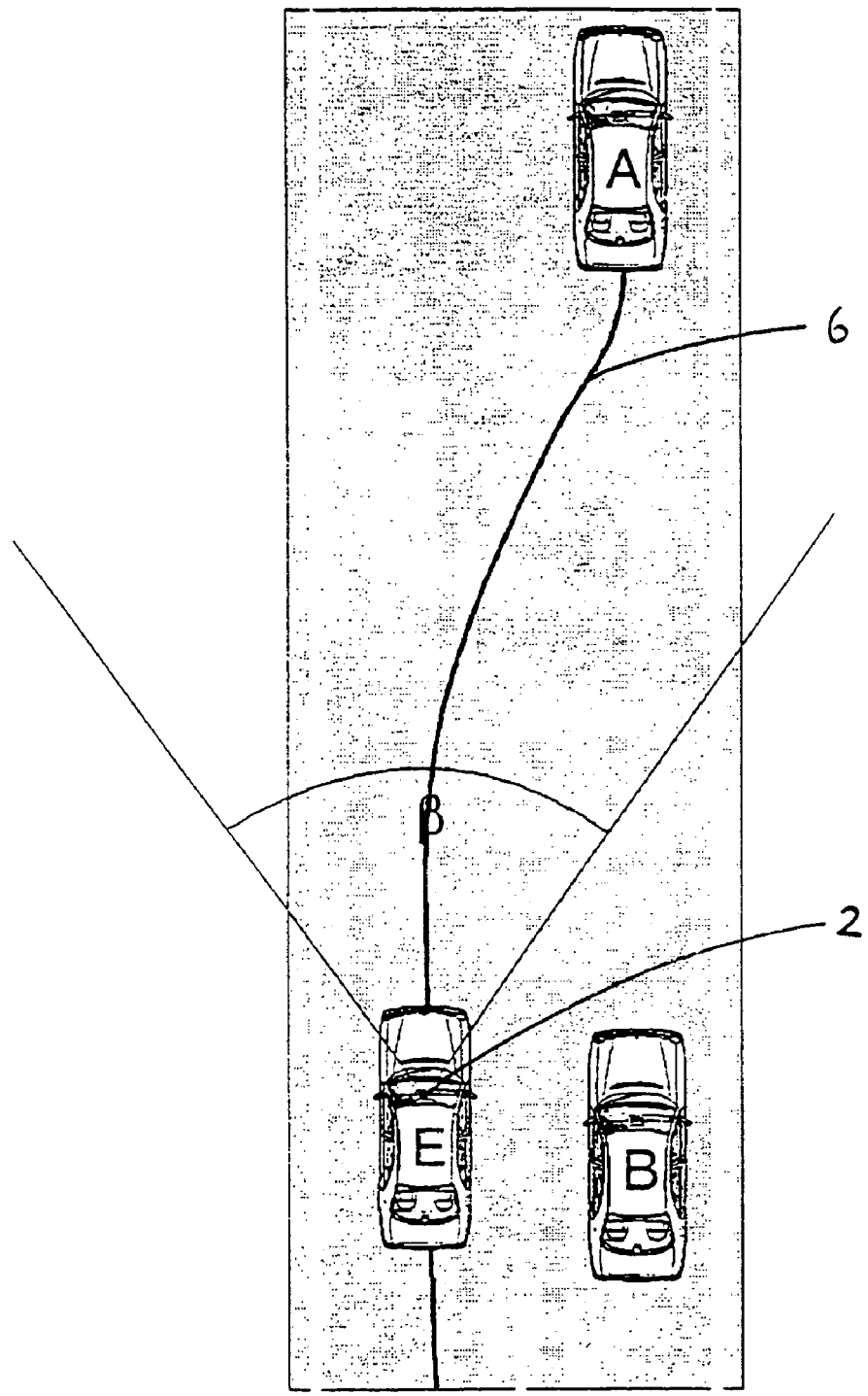
FIG. 2 shows a traffic situation when the vehicle traveling ahead changes lane.

FIG. 2 illustrates what can happen when the vehicle A traveling ahead changes lane from the left-hand lane to the right-hand lane. The vehicle E follows a trajectory 6 of the vehicle A which is calculated by the following-distance control system, and owing to the limited monitoring angle β for the space in front of the vehicle it does not have any knowledge of a vehicle B next to it on the right. This would result in a collision between the vehicles E and B if the vehicle E continues to follow the vehicle A by also changing lane.

Figure 3:
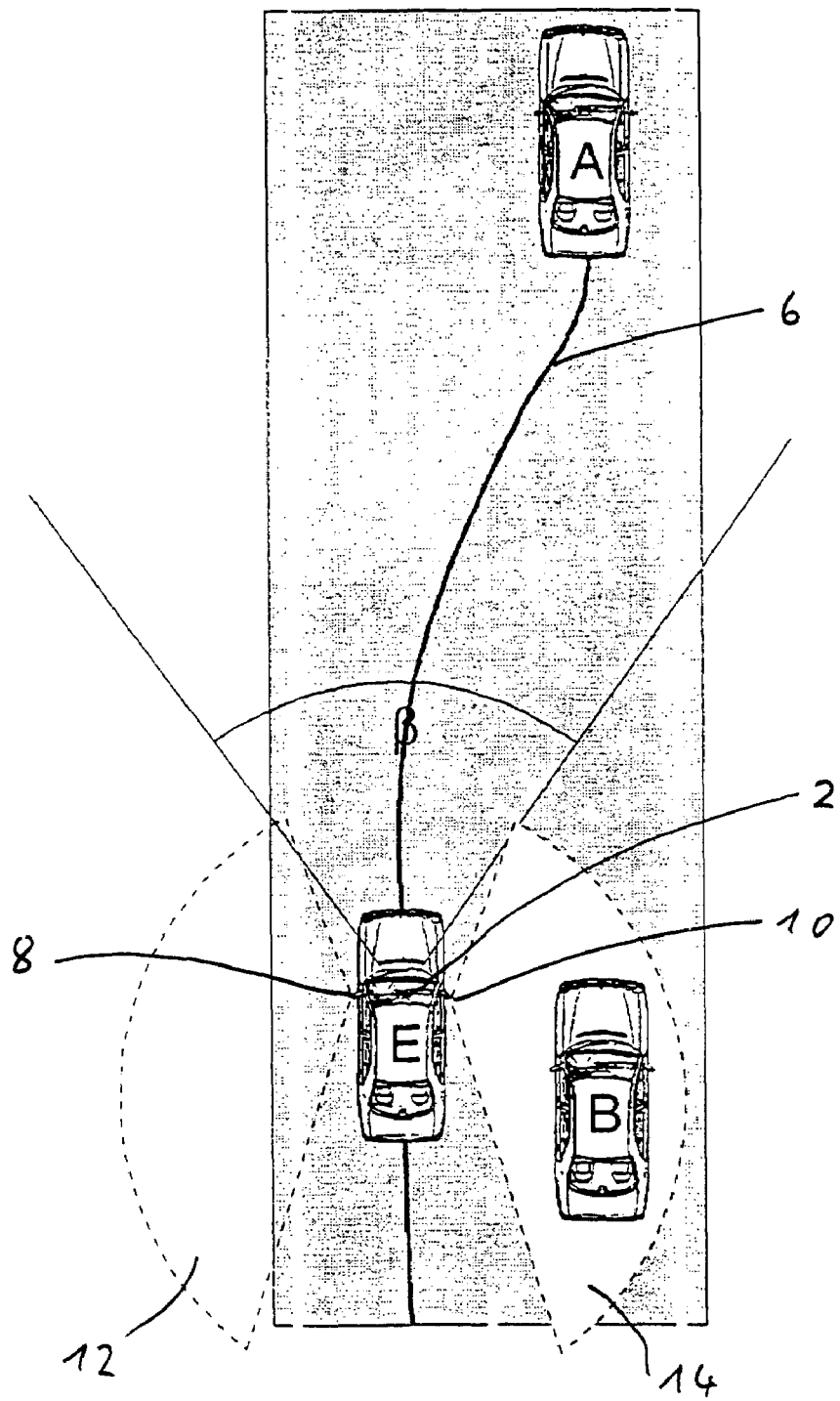
FIG. 3 shows the situation from FIG. 2 with a motor vehicle which has lateral sensors.

In the exemplary embodiment illustrated in FIG. 3, a lateral sensor 8, 10 for monitoring the corresponding lateral rear space 12, 14 is accommodated in each of the left-hand and right-hand rear view mirrors of the vehicle E. Since motor vehicles are generally more than three meters long, the monitored lateral rear spaces 12, 14 may possibly not need to extend this far forward as shown in FIG. 3 if the monitoring angle β for the space in front of the vehicle is large enough.

In the situation illustrated in FIG. 3, the lateral sensor 10 senses the vehicle B in the right-hand lateral rear space 14. The driver of the vehicle E is warned or requested to assume control of the vehicle if the vehicle E will in future undershoot the safe distance from the adjacent vehicle B which is determined by calculation if said vehicle continues to follow the vehicle A along the trajectory 6 calculated by the following-distance control system. This criterion is applied irrespective of whether or not there is a lane. This inventive refinement of the system for automatically following a vehicle prevents a situation in which, for example owing to unpredictable acceleration of the observed vehicle B, a collision occurs with it during the subsequent lane change by a vehicle E.

Data from the automatic following-distance control can additionally be used in a particularly advantageous fashion for predictive determination as to whether the distance from the vehicle B sensed by the lateral sensor will be undershot in future. This data is, for example, data from a navigation system which provides information about a bend lying ahead in the course of the carriageway, something which can significantly affect the shape of the trajectory 6. However, data from a traffic information system which provides information about traffic conditions prevailing in the course of the carriageway lying ahead, such as a traffic jam, a traffic light at red or roadworks, can also have a significant influence on future adaptations of the trajectory 6 and is to be taken into account by the system for automatic following-distance control.

Within the scope of this application, the term lateral sensor [lacuna] a sensor which covers the space about a motor vehicle E, in particular the space next to it and the space behind it. Regions 12 and 14 for the corresponding lateral sensors 8 and 10 are shown as examples of this in FIG. 3. However, it is not absolutely necessary for a lateral sensor to cover regions lying in front of the vehicle E, but it is also conceivable to embody said sensor in such a way that only the space to the rear of the vehicle is covered (corresponding to a dead angle sensor).

The lateral sensor is particularly advantageously a sensor which can resolve its sensing range into a plurality of angular sections so that, depending on the resolution precision, it becomes possible to sense the driving behavior of the vehicle B observed by the lateral sensor. The better this driving behavior can be sensed, the better it is then also possible to determine whether a safe distance from the adjacent vehicle B will be undershot in future.

The invention claimed is:

1. A system for automatic following-distance control of a motor vehicle, the system having at least one sensor configured to monitor the space in front of the motor vehicle(E), an electronic device for regulating travel, braking and steering, and at least one lateral sensor configured to monitor (8; 10) a lateral space (12; 14) in an adjacent lane beside and/or behind the motor vehicle (E), the motor vehicle (E) following a vehicle (A) traveling ahead, wherein if the vehicle (A) performs a lane change, the motor vehicle (E) will follow the lane change only if it is continuously determined in a predetermined fashion, on the basis of signals of the lateral sensor (8; 10), that, during the following-distance control, the motor vehicle (E) will in future not undershoot a safe distance from a vehicle (B) which is sensed, in the lane being changed to, by the lateral sensor.

2. The system for automatic following-distance control as claimed in claim 1, wherein data from automatic following-distance control is additionally used for determining whether the distance from the vehicle (B) sensed by the lateral sensor is undershot.

3. The system for automatic following-distance control as claimed in claim 1, wherein the lateral sensor is a sensor which can resolve its sensing range into a plurality of angular sections.

4. The system for automatic following-distance control as claimed in claim 1, wherein said system is adapted for automatic following-distance control of a motor vehicle in a traffic jam.

5. The system as claimed in claim 1, wherein the lateral sensor is accommodated in a rear view mirror of the motor vehicle.

6. A system for automatic following-distance control of a motor vehicle, the system having at least one sensor configured to monitor the space in front of the vehicle (E), an electronic device for regulating travel, braking and steering, and at least one lateral sensor configured to monitor (8; 10) a lateral space (12; 14) in an adjacent lane beside and/or behind the motor vehicle (E), the motor vehicle (E) following a vehicle (A) traveling ahead, wherein if the vehicle (A) performs a lane change:

the motor vehicle (E) will automatically follow the lane change if it is continuously determined in a predetermined fashion, on the basis of signals of the lateral sensor (8; 10), that, during the following-distance control, the motor vehicle (E) will in future not undershoot a safe distance from a vehicle (B) which is sensed, in the lane being changed to, by the lateral sensor, and if it is determined, on the basis of signals of the lateral sensor (8; 10), that, during the following-distance control, the motor vehicle (E) will in future undershoot a safe distance from a vehicle (B) in an adjacent lane, the driver is requested to assume control of the vehicle, or control of the vehicle is automatically returned to the driver.

7. The system as claimed in claim 6, wherein the driver is additionally warned.

* * * * *